United States Patent
Hilger et al.

(10) Patent No.: US 6,854,438 B2
(45) Date of Patent: Feb. 15, 2005

(54) INTERNAL COMBUSTION ENGINE WITH INJECTION OF GASEOUS FUEL

(75) Inventors: Ulrich Hilger, Essen (DE); Bernd Bartunek, Monheim (DE); Kevin Kwame Oversby, Vancouver (CA); Ian Hayden Lockley, Vancouver (CA); John Gordon Crawford, Richmond (CA); Kenneth R. C. Mann, Vancouver (CA); Richard Wing, Vancouver (CA)

(73) Assignee: Westport Germany GmbH, Dortmund (DE)

( * ) Notice: Subject to any disclaimer, the term of this patent is extended or adjusted under 35 U.S.C. 154(b) by 0 days.

(21) Appl. No.: 10/414,850

(22) Filed: Apr. 16, 2003

(65) Prior Publication Data

US 2004/0069267 A1 Apr. 15, 2004

Related U.S. Application Data

(63) Continuation-in-part of application No. PCT/EP01/12182, filed on Oct. 22, 2001.

(30) Foreign Application Priority Data

Oct. 22, 2002 (DE) .......................................... 100 52 336

(51) Int. Cl.[7] ............................. F02B 9/06; F02P 19/00; F02M 25/07
(52) U.S. Cl. ............... 123/260; 123/143 B; 123/145 A; 123/261; 123/298; 123/299; 123/305; 123/568.12
(58) Field of Search .................. 123/143 B, 145 A, 123/260, 261, 298, 299, 305, 446, 486, 527, 568.12, 568.21

(56) References Cited

U.S. PATENT DOCUMENTS

| 4,627,405 A | 12/1986 | Imhof et al. ................. 123/549 |
| 4,721,081 A | 1/1988 | Krauja et al. ................ 123/298 |
| 4,787,349 A | 11/1988 | Hilger ......................... 123/297 |
| 5,329,908 A | 7/1994 | Tarr et al. .................... 123/527 |
| 6,298,829 B1 | 10/2001 | Welch et al. ................ 123/467 |

FOREIGN PATENT DOCUMENTS

| DE | 3038649 | 1/1984 |
| DE | 3631473 | 11/1988 |
| DE | 4243964 | 6/1994 |
| EP | 0371759 | 6/1990 |
| EP | 0916830 | 5/1999 |
| JP | 09159169 | 6/1997 |
| JP | 2000291495 | 10/2000 |

*Primary Examiner*—Tony M. Argenbright
(74) *Attorney, Agent, or Firm*—McAndrews, Held & Malloy, Ltd.

(57) ABSTRACT

An internal combustion engine comprises a fuel injection nozzle for injecting a gaseous fuel directly into the combustion chamber. shield, is installed in close proximity to the fuel injection nozzle, provides a shielded space around a hot surface igniter and restricts flow between the shielded space and the combustion chamber. The nozzle comprises a fuel injection port oriented to direct a fuel spray against a surface of the sleeve An inlet in the sleeve allows air and fuel to enter the shielded space to form a combustible mixture therein. The sleeve contains a substantial amount of the combustible mixture within the shielded space until it ignites and pressure builds within the shielded space to propel a combustion flame through at least one discharge opening and into contact with the fuel sprays emerging from the fuel injection nozzle.

88 Claims, 7 Drawing Sheets

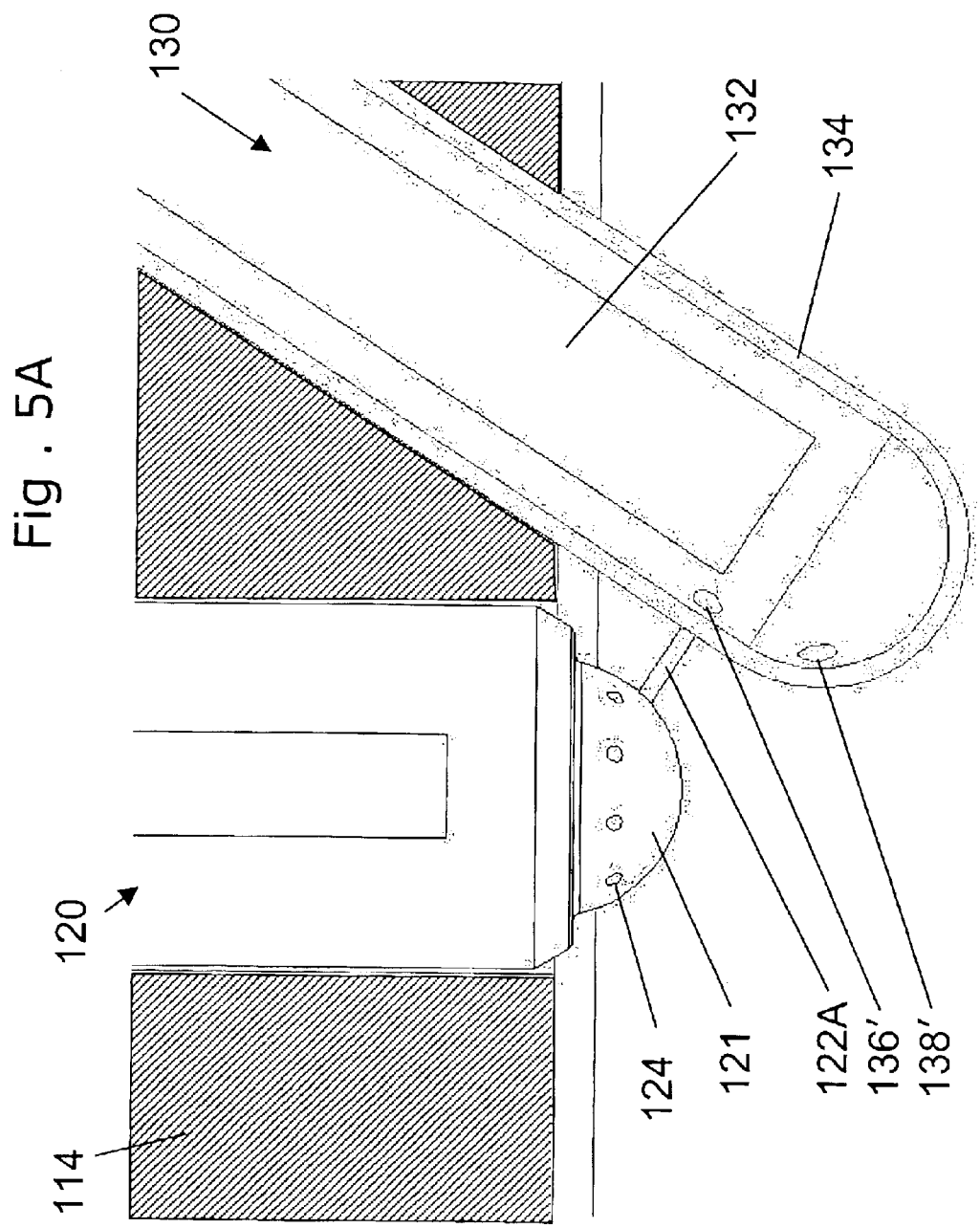

INTERNAL COMBUSTION ENGINE WITH INJECTION OF GASEOUS FUEL

CROSS-REFERENCE TO RELATED APPLICATION(S)

This application is a continuation-in-part of International Application No. PCT/EP01/12182, having an international filing date of Oct. 22, 2001, entitled, "Internal Combustion Engine With Injection of Gaseous Fuel". International Application No. PCT/EP01/12182 claimed priority benefits, in turn, from German Patent Application No. 10052336.6 filed Oct. 22, 2002. International Application No. PCT/EP01/12182 is hereby incorporated by reference herein in its entirety.

TECHNICAL FIELD

The invention relates to an apparatus and method for operating a gaseous-fueled internal combustion engine that comprises a fuel injection nozzle with a nozzle disposed in a combustion chamber for injecting gaseous fuel directly into the combustion chamber. An ignition device, also disposed within the combustion chamber, is installed in close proximity to the fuel injection nozzle. The ignition device comprises a sleeve that provides a shielded space around a hot surface igniter.

BACKGROUND

Liquid-fueled internal combustion engines have been used to produce power and drive machines for over a century. From the beginning, internal combustion engines have undergone many improvements to become more efficient, more powerful, and/or less polluting. To assist with these improvements, fuel properties and quality have also improved, and alternative fuels such as methanol and other alcohol-based fuels have also been considered to help with reducing harmful emissions. However, compared to such liquid fuels, an equivalent amount of a combustible gaseous fuel, such as methane, hydrogen, natural gas, and blends of such fuels, with equivalence measured on an energy basis, can be combusted to produce the same power while producing less harmful emissions in the form of particulates and greenhouse gases.

However, a problem with replacing liquid fuel with such gaseous fuels in a conventional internal combustion engine has been that such gaseous fuels typically do not ignite as readily as liquid fuels. There are also many other differences that result when a gaseous fuel is substituted for a liquid fuel. For example, the combustion strategy may be different to account for longer ignition delays associated with a gaseous fuel, or a longer time may be required to inject a gaseous fuel into the engine. In addition, the fuel supply system and the manner of introducing the fuel into the engine typically require equipment specialized for handling gaseous fuels. Furthermore, the selected combustion strategy may dictate a different geometry for the combustion chamber. Accordingly, a design suitable for a liquid-fueled engine may not be suitable for a gaseous-fueled engine without considerable modifications, which can influence commercial viability.

Gaseous-fueled engines currently used in commercial vehicles operate using the Otto cycle with homogeneous mixture formation, spark ignition, and throttle control, and these engines are predominantly derived from modified diesel-cycle engines, because of the power and torque required for commercial vehicles. For example, the mixture forming process, modified from that of diesel-cycle engines, as well as the use of spark ignition, are aspects that require respective modifications of the intake system and the cylinder head. The modified combustion process also necessitates a modified combustion chamber recess in the piston. Engine manufacturers usually make efforts to keep the number of engine components that need to be modified for gaseous fuel operation as low as possible. This is an attempt to limit the additional manufacturing costs for adapting engines to use gaseous fuel, if possible, while maintaining the durability and long service life that operators of conventionally-fueled engines have become accustomed to for their commercial vehicles.

For gaseous-fueled internal combustion engines, one of the predominant combustion processes operates with stoichiometric fuel-air mixtures in combination with a three-way catalytic converter. Initially demand for gaseous-fueled engines in commercial vehicles was based on the desire for low-emission characteristics, with efficiency and fuel consumption characteristics being secondary considerations. The admixture of gaseous fuel typically takes place through a gaseous fuel mixer, arranged in the center of the intake system, with electronically controlled gaseous fuel supply. More recent gaseous fuel systems have switched to multi-point injection in front of the intake valve of each cylinder, to improve equal distribution of the fuel and to maintain a stoichiometric mixture composition during non-stationary engine operation. In order to maintain the stoichiometric ($\lambda=1$) fuel-air mixture, a 'closed-loop' air/fuel ratio control known from gasoline engines can be employed. The compression ratio is generally limited to values between 11:1 and 11.5:1 to ensure a sufficient safety margin against knocking.

The performance that can be achieved by non-supercharged engines with stoichiometric control is at least 5% below that of naturally aspirated liquid-fueled diesel-cycle engines, caused by the decreased air volume drawn in by the engine, which results from the addition of the gaseous fuel into the intake pipe. Compared to today's supercharged liquid-fueled diesel-cycle engines, gaseous-fueled Otto cycle engines produce up to 15% less power, taking into account the effect of the higher thermal loads associated with Otto cycle engines. This loss in power already takes into account that the use of exhaust gas recirculation with EGR rates of up to 15% can reduce the thermal load. The only way to completely compensate for the lower performance of Otto cycle engines is to increase the displacement.

The fuel economy of stoichiometrically-controlled gaseous fuel engines is characterized by an energy consumption that is 15 to 20% higher in stationary 13 mode tests than that of comparable diesel engines. When operating frequently under low load, as is typical for buses operating in cities, the throttle control has been found to be responsible for an increase in fuel consumption of above 40%.

The disadvantages with respect to power and fuel economy of stoichiometrically-controlled gaseous-fueled engines, in comparison to today's liquid-fueled diesel cycle engines, can be significantly reduced by employing lean-mix engine concepts. Mixture formation usually takes place downstream of the turbo charger in an electronically controlled fuel-air mixer centrally located in the intake system. For compression ratios between 11:1 and 11.5:1, the lean-mix engine as a rule possesses a combustion chamber geometry similar to those of stoichiometrically-controlled engines. Since leaner natural gas fuel-air mixtures lead to a strongly decreasing rate of combustion, a suitable adjustment of, for example, the squish flow is necessary to counteract a prolonged combustion process with accordingly higher hydrocarbon emissions. Air ratios achievable by today's lean-mix engines are not higher than $\lambda=1.5$ for high engine loads and thus higher rates of combustion. At low engine loads, the combustion temperature is lower and the ability to operate on a lean mixture is thus limited to $\lambda$ values between 1.1 and 1.3.

Since thermal stresses on components of lean-mix engines are lower than those in stoichiometrically-controlled gaseous fuel engines, it becomes possible to significantly increase the boost pressure, so that in combination with charge-air cooling one can achieve effective average pressures of up to 14 bar. The torque band to a large extent corresponds to that of a large number of commercially available liquid-fueled diesel-cycle engines. However, lean-mix engines still may suffer from significant power disadvantages in comparison to the power levels achieved by Euro 3 type liquid-fueled diesel cycle engines.

Since the ability to operate today's lean-mix engines on even leaner mixes is limited, especially in the lower partial load range, to $\lambda$ values of 1.2 to 1.4, due to the slow rate of combustion of natural gas, these engines also require throttle control. Accordingly, the ECE R49 emission test determines fuel consumption rates that are, depending on the engine design, more than 15% higher than those of comparable liquid-fueled diesel cycle engines. For example, during everyday operation of a city bus, this results in fuel consumption values that are up to 30% higher because of the large proportion of operating time when the engine operates under idle or low load conditions.

Lean-mix concepts for natural gas engines aimed at meeting the new Euro 4 emission standards coming into effect in 2005 will be characterized by further developments of existing lean-mix engine concepts aimed at a broadening of the limits of lean-mix operation to be able to reduce NOx emission values below the limit of 3.5 g/kWh.

For this purpose, combustion processes are being developed that are characterized by a more intensive cylinder charging movement, to compensate for the strongly decreasing rate of combustion of very lean mixtures with a relative air/fuel ratio of up to 1.6 at operating points close to full load. Lean-mix engines of this type possess combustion processes with increased ability to run on lean mixtures and also are equipped with exhaust turbo-charging and charge-air cooling. Depending on the design, the compression ratio lies between 11.7:1 and 13:1. Such designs should be able to achieve NOx values in the ECE R49 emission test of between 1.5 g/kWh and 2 g/kWh, given hydrocarbon values upstream of the catalytic converter of approximately 2.9 g/kWh.

Due to the higher compression ratio and the lean mixture under full load, the maximum engine efficiency can be increased up to a value of 40%. Consequently, in an ECE R49 test cycle, the fuel consumption values should only be 5% to 15% higher than those of future liquid-fueled diesel cycle engine designs for the Euro 4 emission standard. Depending on the design of the turbo charger, the achievable mean pressure may reach a maximum effective mean pressure of 14 bar to 18 bar.

In addition to developments in the area of homogeneous lean-mixture processes, recent efforts have been directed to processes with high-pressure gaseous fuel injection directly into the combustion chamber of an unthrottled engine. Such engines can employ a compression ratio similar to those employed in liquid-fueled diesel cycle engines because knocking is not a problem. For example with this type of engine, a compression ratio of between 16:1 and 18:1 can be employed. An advantage of this approach is that the low emission levels achievable with a gaseous-fueled engine can be combined with the significantly higher efficiency levels normally only associated with liquid-fueled diesel-cycle engines.

U.S. Pat. No. 5,329,908 discloses a compressed natural gas injection system for gaseous-fueled engines. The fuel injection nozzle is operated so that during the injection process the gaseous fuel spreads as a cloud into the combustion chamber recess through an annular discharge opening being formed during the injection process. During this process, part of the cloud comes into contact with an ignition plug and the fuel-air mixture within the combustion chamber is ignited at the ignition plug. One of the described embodiments uses a constant pressure gas supply and a conventional glow plug serves as the ignition plug. A fuel supply unit is described for ensuring that the gaseous fuel can be supplied to the fuel injection valves with a pressure that is high enough to introduce the fuel into the combustion chamber when the piston is near top dead center. This engine operates in a high efficiency mode that achieves efficiencies like those of a liquid-fueled diesel-cycle engine. However, conventional glow plugs like those used in diesel engines are designed to provide ignition assistance only during start-up because diesel fuel readily auto-ignites at the pressures and temperatures normally present in a diesel engine once it is running. With gaseous fuels like natural gas, which do not auto-ignite as readily as diesel, with the disclosed arrangement an ignition plug may be needed to continuously provide ignition assistance to initiate combustion. Continuous activation of a conventional glow plug, which is only designed for brief use during start up, can lead to early failure. Experiments have shown that the length of a glow plug's service life generally decreases as operating temperature increases, and that conventional glow plugs can not be relied upon to provide the durability that operators of gaseous-fueled internal combustion engines are expected to demand.

U.S. Pat. No. 4,721,081 is directed towards a glow plug shield with thermal barrier coating and ignition catalyst, which purports to extend the service life of a glow plug that is used to ignite fuels that are not auto-ignitable. In the background discussion provided by the '081 patent, it is noted that it is known to provide protective tubular shields of metal or ceramic circumferentially surrounding a glow plug along its length. Further, that it is also known to protect a silicon nitride glow plug by coating the plug with a refractory metal oxide and to provide the glow plug with a combustion promoting catalyst so that the glow plug temperature may be reduced. The improvements added by the '081 patent includes a shield that has an oblique open end that exposes the glow plug in the direction of the fuel injector, while providing a solid physical barrier in the direction of the intake valves. The '081 patent further discloses coating the interior and exterior of the shield with a ceramic refractory material, such as a metal oxide that acts as a thermal barrier so that the shield reduces the cooling effect of the inlet gas on the glow plug and also reduces the electrical power needed by the glow plug to maintain a surface temperature suitable for sustaining good combustion. According to the '081 patent, to further reduce the required glow plug temperature and extend glow plug life, a combustion catalyst may be incorporated into the coating.

There is a need for a gaseous-fueled internal combustion engine that can match the performance, efficiency, reliability, and durability of an equivalent liquid-fueled diesel-cycle engine, while producing lower amounts of harmful emissions such as particulate matter and nitrogen oxides. Such an engine can play a major role in the improvement of air quality, especially in highly populated areas where presently there is concentrated use of liquid-fueled diesel-cycles engines and where gaseous fuels such as natural gas can be easily distributed.

SUMMARY

A method and apparatus are provided for injecting gaseous fuel into the combustion chamber of an unthrottled high compression engine. For example, in an engine with a compression ratio of between 16:1 and 18:1, the gaseous fuel can be injected at a high pressure of between 200 and 300 bar, towards the end of the compression stroke. This results in the formation of an inhomogeneous fuel-air mixture, similar to that found in a diesel engine. A high-speed gaseous fuel injection valve is employed to inject the gaseous fuel into the combustion chamber. The combustion chamber is defined by a cylinder, a piston that is reciprocable within the cylinder, and a cylinder head covering one end of the cylinder. The combustion chamber can be further defined in part by a piston bowl or recess formed in the piston head (which is the end surface of the piston that faces the combustion chamber). Using the present method and operating with a compression ratio substantially the same as that of an equivalent diesel engine, it is possible to reduce the modifications required for natural gas operation and to reduce manufacturing costs, by shaping the combustion chamber so that it corresponds largely to the geometry of combustion chambers found in conventional diesel engines.

Due to the insufficient ability of gaseous fuels such as natural gas to reliably self-ignite in an internal combustion engine, ignition of the fuel-air mixture is ensured by a method comprising:

introducing a gaseous fuel into the combustion chamber by means of a plurality of fuel sprays released into the combustion chamber from a fuel injection valve disposed within the combustion chamber;

directing one of the fuel sprays, referred to as an ignition spray to an impingement point on a surface of a sleeve that surrounds an igniter so that when the ignition spray exits its respective fuel injection port a substantial portion of the gaseous fuel flows towards the impingement point in a spray direction that is oriented between less than or equal to 25 degrees from an axis perpendicular to a plane that is tangential to the sleeve at the impingement point, whereby some of the gaseous fuel from the ignition fuel spray flows through an intake opening provided in the sleeve and mixes with air in a shielded space provided between the igniter and the sleeve to form a combustible fuel-air mixture next to the igniter;

igniting the combustible fuel-air mixture by heating a surface of the igniter to a temperature that causes ignition of the combustible fuel-air mixture; and restricting fluid flow between the combustion chamber and the shielded space and retaining a substantial portion of the combustible fuel-air mixture within the shielded space until combustion of same increases pressure within the shielded space to a magnitude that propels a burning fuel-air mixture therefrom, through at least one discharge opening and into contact with the plurality of fuel sprays in a region of the combustion chamber that surrounds the fuel injection valve.

Because the method results in a burning fuel-air mixture that is propelled across the combustion chamber that ignites the fuel therein, there is no need to control lambda to ensure substantially complete combustion because the problem of flame quenching in lean pockets is eliminated. Unlike earlier gaseous-fuelled engines that throttled the intake air, with this method a gaseous-fuelled engine can operate in the same manner as a conventional liquid-fuelled diesel engine with no throttling. Accordingly, with the present method, the engine is operable with a lambda between 1.4 (at high load conditions) and 6 (at idle).

In the preferred method, the spray direction of the ignition spray is substantially perpendicular to the plane that is tangential to the surface of the sleeve at the impingement point.

A preferred embodiment of the method further comprises injecting the gaseous fuel into the combustion chamber at a first flow rate when the engine is operating at low load or idle, and injecting the gaseous fuel into the combustion chamber at a second flow rate when the engine is operating at high load, wherein the second flow rate is higher than the first flow rate.

To further improve combustion stability and engine efficiency, the method can further comprise controlling the flow rate so that for expected operating conditions the desired fuel quantity of the gaseous fuel can be injected into the combustion chamber by an injection event that has a duration that is longer than an ignition delay associated with the ignition of the gaseous fuel that was directed towards the igniter at the beginning of the injection event. In this way, the duration of an injection event is controllable so that a combustible fuel-air mixture is provided near the fuel injection valve where it can be ignited by the burning fuel-air mixture propelled from the shielded space, even during low load and idle conditions. Injection timing and injection event duration are preferably controlled as a function of measured engine operating conditions and by referring to an electronic engine map.

The method can further comprise controlling the fuel injection valve to control the mass flow rate of the gaseous fuel that is introduced during an injection event. This method comprises:

referring to the electronic engine map and determining a total amount of the gaseous fuel that will be introduced during an injection event for a detected engine load;

during a first stage of the injection event, selecting a first mass flow rate that will cause the combustible mixture to form within the shielded space; and during a second stage of the injection event, selecting a second mass flow rate that will augment the gaseous fuel introduced during the first stage to provide the total amount of gaseous fuel during the injection event.

In a preferred embodiment the duration of the first stage begins at about 2 milliseconds before the second stage. The first stage can begin further ahead of the second stage if the engine is operated with a longer ignition delay, for example, during certain predetermined operating conditions such as start up when the combustion chamber is colder than normal operating temperature, or if the temperature of the igniter is set to be a lower temperature.

The second stage can begin at between about 34 and 5 crank angle degrees before top dead center during a compression stroke. Factors such as the desired total quantity of fuel to be injected or controlling combustion temperature can determine the timing for beginning the second stage.

In the preferred method the gaseous fuel that is introduced during the second stage is ignited during the second stage. That is ignition of the second stage occurs before the second stage is completed.

Another preferred method comprises introducing the gaseous fuel into the combustion chamber in a plurality of injection events during a single engine cycle. For example, a first injection event can be employed to introduce a first quantity of the gaseous fuel into the combustion chamber to be ignited by the igniter, followed by at least one other injection event to introduce a second quantity of the gaseous fuel. The first and second quantities of fuel together provide a total quantity of fuel that is equal to a desired amount determined by an engine controller, with reference to an engine map. The first quantity of fuel can be determined by the engine controller to be a quantity that is sufficient to ensure that the second quantity of fuel is ignited. The timing for the first injection event is preferably governed by the desired ignition timing and the timing for the second injection event can be governed by the timing that will result in the desired combustion characteristics.

In an example of this method, an ignition quantity of fuel that represents 5% to 10% of the fuel quantity needed at full load is introduced into the combustion chamber by the first injection event. The second injection event is employed to inject a main quantity of fuel into the combustion chamber to supplement the ignition quantity of fuel to provide the amount of fuel required to satisfy the demanded engine load, as determined by the engine controller by referring to an engine map. In this example, the two separate fuel injection events can be timed to provide more intensive and thus more stable ignition of the fuel-air mixture without an increase in the surface temperature of the igniter, a prerequisite for lower emissions of carbon monoxide and unburned fuel. In addition, because some of the fuel is introduced during the first injection event, this results in a smaller ignitable mixture volume when combustion begins, which leads to a lower heat release rate and thus less combustion noise.

When two injection events are used for one combustion cycle, engine tests have shown that good results can be achieved when the first injection event has a duration of between about 0.2 and 0.5 milliseconds. The second injection event can begin at between about 34 and 5 degrees before top dead center during a compression stroke. The second injection event preferably starts less than or equal to 1 millisecond and more than 0.2 millisecond after the end of the first injection event so that combustion of the fuel introduced by the first injection event can ignite the fuel introduced by the second injection event.

This method can further comprise dividing the main injection quantity into a plurality of individual injection events with the number of injection events limited only by the actuation capabilities of the fuel injection valve. With this approach one can control the spatial and time distribution of the fuel-air mixture in the combustion chamber, which can be especially advantageous for the overall combustion process as well as the surface ignition process. Preferably, and especially at the beginning of the combustion event, the burning fuel-air mixture emerging from the ignition device is propelled rapidly into the combustion chamber. During the later course of the fuel injection process, an increase of the injected fuel volume and mass, under stable combustion conditions, makes it possible to achieve a shortening of the total combustion time, which is advantageous for obtaining a high thermal efficiency.

This aspect of the method, which relates to employing a plurality of injection events, can be combined with controlling flow rate and injection event duration for additional control over the combustion process.

In preferred embodiments, the igniter is electrically heated. Another feature that can be incorporated into the present method comprises controlling the electrical heating energy delivered to the igniter depending upon the engine's operating conditions. That is, the method can further comprise controlling the temperature of the igniter as a function of a measured operating parameter of the engine. For example, when high load conditions are detected, the higher combustion chamber temperatures can provide heat to the igniter and reduce the requirements for electrical heating energy. Reducing the electrical heating energy that is delivered to the igniter under such conditions can result in a significant increase in the service life of the igniter.

On the other hand, at low engine load, with the associated lower combustion chamber temperature, and at high engine speeds and low engine load, the igniter is subject to a greater heat loss, which can be compensated for by increasing the electrical power to the igniter. If such conditions are not compensated for, misfire or longer ignition delays can result, causing among other things, lower efficiency and higher emissions of unburned fuel.

A combustion catalyst coating can also be disposed on the igniter and/or sleeve so that the igniter temperature can be reduced to increase service life and reduce power required to heat the igniter. The catalytic coating can be disposed on the sleeve or on the igniter itself.

For practicing the disclosed method an internal combustion engine that can be fueled with a combustible gaseous fuel is disclosed herein. This internal combustion engine comprises:

at least one combustion chamber defined by a cylinder, a piston reciprocable within the cylinder, and a cylinder head that covers an end of the cylinder;

an ignition device with an end disposed within the combustion chamber, the ignition device comprising an igniter that is heatable to provide a hot surface and a sleeve surrounding the igniter, the sleeve defining a shielded space between the igniter and the sleeve;

a fuel injection valve disposed within the combustion chamber, the fuel injection valve being operable to introduce the combustible gaseous fuel into the combustion chamber with a plurality of fuel sprays each released from one of a plurality of fuel injection ports, wherein one of the plurality of fuel injection ports is oriented to direct a fuel spray, referred to as an ignition fuel spray, towards an impingement point on a surface of the sleeve so that when the ignition fuel spray exits its respective fuel injection port a substantial portion of the ignition fuel spray is flowing in a spray direction that is oriented less than or equal to 25 degrees from an axis perpendicular to a plane that is tangential to the sleeve at the impingement point;

an intake opening provided through the sleeve near the impingement point connecting the shielded space to the combustion chamber whereby, when the ignition fuel spray impacts the impingement point, a portion of the combustible gaseous fuel contained within the ignition fuel spray passes through the intake opening and into the shielded space;

a discharge opening provided through the sleeve, wherein the discharge opening is oriented to direct a burning fuel-air mixture from the shielded space and towards the plurality of fuel sprays within a region surrounding the fuel injection valve; and wherein the sleeve restricts flow between the shielded space and the combustion chamber so that combustion of the combustible gaseous fuel within the shielded space produces a pressure therein that is higher than the pressure within the combustion chamber and the pressure is high enough to propel the burning fuel-air mixture into the combustion chamber and into contact with the plurality of the fuel sprays.

For the purposes described herein, a "substantial portion" of the ignition fuel spray is flowing in a spray direction that is oriented less than or equal to 25 degrees from an axis perpendicular to a plane that is tangential to the sleeve at the impingement point, when, during engine operation, each injection event causes an amount of fuel from the ignition spray to enter the shielded space that is sufficient to form a combustible mixture that is ignitable to propel a burning fuel-air mixture into the combustion chamber where it ignites a combustible mixture within a region surrounding the fuel injection valve.

The spray direction of the ignition fuel spray directs a substantial portion of the fuel spray in a direction that is substantially perpendicular to the plane that is tangential to the sleeve at the impingement point. Because fuel diverges from the centerline of the ignition fuel spray as it travels away from the fuel injection nozzle, the centerline of the ignition fuel spray can be in a direction that is not perpendicular to the plane that is tangential to the sleeve at the impingement and a substantial portion of the fuel within the ignition spray can still be flowing substantially perpendicular to such plane when it strikes near the impingement point. However, the most preferred arrangement is when the central axis of the ignition fuel spray is substantially perpendicular to the plane that is tangential to the sleeve at the impingement point.

For a cylindrical shape, there is only one plane that is tangential in all directions for a given point on the cylinder. Shapes other than a cylinder can be employed for the sleeve at the impingement point, and the definition of the directional orientation of the ignition fuel spray relative to the plane that is tangential to the surface can also be applied to other sleeve shapes. For sleeve shapes that do not have a tangential plane, the equivalent approach would be to employ an orientation for the ignition fuel spray that results in a reduction of the momentum and velocity of the fuel that enters the shielded space to thereby form a combustible mixture therein.

The hot surface of the igniter is preferably provided by a member that extends into the shielded space from a holder mounted in the cylinder head. The igniter member preferably has a tip that is located within 3 millimeters of the centerline of the intake opening. More preferably, the tip of the igniter element is within 1 millimeter or level with the centerline of the intake opening.

In preferred embodiments the fuel injection valve has an elongated body with a longitudinal axis that is parallel to a longitudinal axis of the cylinder. In a preferred arrangement, the end of the ignition device disposed within the combustion chamber is angled towards the fuel injection valve whereby the ignition device has a longitudinal axis that is at an acute angle to the longitudinal axis of the fuel injection valve.

In one embodiment, each one of the plurality of fuel injection ports is oriented to direct the plurality of fuel sprays into the combustion chamber at a first injection angle measured from the cylinder head, except for the fuel injection port that is associated with the ignition fuel spray, which is oriented to direct the ignition fuel spray into the combustion chamber at a second injection angle, different from the first injection angle. The second injection angle is predetermined by the alignment of the plane that is tangential to the sleeve at the impingement point relative to the fuel injection port, whereas the first injection angle is predetermined by the desired distribution pattern for introducing the gaseous fuel into the combustion chamber.

In another embodiment, at least one of the plurality of fuel sprays is introduced into the combustion chamber through one of the plurality of fuel injection ports that is oriented to direct the at least one fuel spray at an injection angle measured from the cylinder head that is different from that of the ignition fuel spray. The injection angle of the plurality of fuel sprays is preferably between 10 and 25 degrees measured from the cylinder head. In some embodiments, the injection angle for the plurality of fuel sprays can be smaller than the injection angle for the ignition fuel spray.

In preferred embodiments, the engine is operable with a compression ratio up to 25:1, and more preferably between 13:1 and 25:1. An engine with a variable compression ratio can be employed to change the compression ratio based upon an operating parameter such as engine load. For example, at low loads, a higher compression ratio can be employed to increase in-cylinder temperature at the end of the compression stroke to improve the combustion process and reduce the quantity of unburned hydrocarbons exhausted from the engine. At higher loads a reduced compression ratio can be employed to allow for a reduced peak cylinder pressure and lower combustion noise. With such a method, the thermal efficiency of the engine can be increased.

The size of the fuel injection valve's fuel injection ports are determined by the flow cross section required for the implementation of full load operation. Consequently, to achieve a desired duration for the fuel injection event for stable ignition during operation at lower loads, a fuel injection valve that is operable to modulate flow rate between zero and a maximum flow rate during an injection event is needed. Accordingly, a preferred fuel injection valve comprises an actuator that can be controlled to control movement of the valve needle, and consequently flow rate through the fuel injection ports. For example an injection valve that employs a piezoelectric or magnetostrictive actuator would be suitable for this purpose. Tests have shown that adjusting the time-behavior of the injection of the main fuel quantity by varying the stroke of the valve needle during the injection process can provide a means for controlling the characteristics of the combustion process.

Known actuators for fast operation of the fuel injection valve can be employed, such as hydraulic, electromagnetic, piezoelectric, and magnetostrictive actuators. For a hydraulically actuated fuel injection valve, an electromagnetic, piezoelectric, or magnetostrictive actuator can be used to operate the hydraulic valve that controls the flow of hydraulic fluid in and out of the fuel injection valve.

An electronic controller preferably controls actuation of the fuel injection valve using electronic map control, for fuel metering, adjusting timing for the start of injection, and controlling flow rate during an injection event.

The ignition fuel spray preferably has a free length of between about 3 and 8 millimeters. The free length is the distance between the fuel injection port that is aimed at the ignition device and the impingement point where the ignition fuel spray impinges upon the ignition device. The preferred free length corresponds to between 5% and 10% of the diameter of the piston bowl, with lower percentages within this range being generally associated with larger piston bowl diameters and higher percentages within this range being generally associated with smaller piston bowl diameters. In a preferred embodiment, the gaseous fuel injection pressure is kept at a constant pressure between 200 and 300 bar.

The intake opening can be one of a plurality of intake openings with each intake opening positioned near the impingement point so that at least some of the combustible gaseous fuel from the ignition fuel spray that impinges upon the ignition device flows through the plurality of intake openings and into the shielded space. In preferred embodiments the impingement point is equidistant from the center of each of the intake openings. When there are two intake openings, the impingement point can be the midpoint of a straight line drawn between the centers of each of the two intake openings. Engine tests have shown that good results can be achieved with a spacing between the centers of two intake openings of about 3 millimeters.

The discharge opening can be one of a plurality of discharge openings. Each one of the discharge openings is spaced further from the impingement point than the spacing between the intake opening and the impingement point. Preferably, the size of each one of the plurality of discharge openings is determined by the combined flow area required to allow a desired flow through the plurality of discharge openings during full load operating conditions. In a preferred embodiment, the combined open area is between about 0.75 and 5.0 square millimeters.

In preferred embodiments, the sleeve can be equipped with between two and ten fuel passage openings, and more preferably with four to six openings. The number of openings is chosen as a function of the piston diameter, the combustion chamber diameter, the maximum crankshaft speed, and the general operating conditions.

In a preferred embodiment, the intake opening(s) are provided through a lateral surface of the sleeve and the discharge opening(s) are provided through a dome-shaped end surface of the sleeve and their functionality is determined by their respective spacing from the impingement point where the ignition fuel spray is aimed.

The sleeve preferably has a closed end with the intake opening(s) and the discharge opening(s) being the only means for fluid communication between the combustion chamber and the shielded space.

In a preferred embodiment, there are two intake openings and two discharge openings and each opening is round and has a diameter that is no less than 0.5 millimeter and no more than 1.2 millimeters.

The effectiveness of the ignition device depends upon the sleeve being designed for a plurality of functions that are balanced against each other. On the one hand, the sleeve functions to shield the igniter from being fully exposed to the pulsating flows of the fuel-air mixture in the combustion chamber and the cooling effects of the intake charge and the gaseous fuel that are introduced into the combustion chamber. For this function, the sleeve is preferably closed-ended and surrounds the igniter to restrict flow between a shielded space around the igniter and the combustion chamber. On the other hand, for the ignition device to function, some fluid communication is needed between the combustion chamber and the shielded space so that a sufficient quantity of gaseous fuel can enter the shielded space to form a combustible fuel-air mixture that can be ignited by coming into contact with a hot surface of the igniter. For this function, the sleeve has at least one intake opening that allows fluid communication between the combustion chamber and the shielded space. The size and position of the intake opening(s) are selected so that the portion of the ignition fuel spray that enters into the shielded space through the intake opening(s) provides substantially all the fuel that is needed to initiate combustion within the shielded space and the combustion chamber. Accordingly, the ignition device is capable of igniting a combustible fuel-air mixture that forms within the shielded space and is designed to propel a burning fuel-air mixture into the combustion chamber. The discharge opening(s) provided through the sleeve allow a burning fuel-air mixture to exit the shielded space. Because the disclosed arrangement allows the needed amount of gaseous fuel to flow into the shielded space through the intake openings, the discharge opening(s) can be sized and oriented solely for directing a burning fuel-air mixture towards predetermined spaces within the combustion chamber to ignite the rest of the gaseous fuel. The total open area provided by the intake and discharge openings is very much less than the open area provided by previously known perforated or open-ended shields. Another benefit of the disclosed sleeve is that fluid flow between the combustion chamber and the shielded space is restricted for fluids entering and exiting the shielded space. That is, once a combustible fuel-air mixture forms within the shielded space and is ignited by contacting the hot surface of the igniter, pressure can build within the shielded space. Previously known shields, which have open ends or highly perforated sleeves, do not restrict flow back into the combustion chamber to the same degree. It is believed that a benefit of the present design is that it allows higher pressures to build, which helps to propel the burning fuel-air mixture through the discharge opening(s).

In preferred embodiments, the ignition device's discharge opening(s) are oriented to direct the burning fuel-air mixture towards the plurality of fuel sprays where a fuel-rich combustible mixture is provided.

As described above, the ignition fuel spray is at least one of a plurality of fuel sprays and the fuel sprays that are not aimed at the ignition device are oriented to distribute gaseous fuel uniformly within the rest of the combustion chamber to mix with the intake charge and form a combustible mixture. In preferred embodiments, the nozzle for the fuel injection valve can employ between four and twelve fuel injection ports, depending upon factors such as the diameter of the combustion chamber, the swirl-amplification of the fuel-air mixture formation that is required as a function of the maximum crankshaft speed, and of the general operating conditions. For example, more injection ports are normally preferred for larger combustion chambers.

Experiments have shown that the disclosed engine design, which combines an ignition device with an ignition spray of short free length, and a high compression ratio typical of self-igniting internal combustion engines (diesel engines), enables operationally dependable, reliable and low-emission operation of an internal combustion engine. Furthermore, in comparison to known configurations, an ignition device that comprises a sleeve disposed around an igniter to provide a shielded space next to the igniter can be employed to significantly reduce the heating power to be supplied to the igniter.

The igniter is preferably electrically heated, such as, by way of example, a glow plug. However, the glow plug should be designed for continuous operation under the operating conditions associated with the present engine. The igniter and/or the sleeve can comprise a ceramic surface. Furthermore, a combustion catalyst can be deposited on the igniter or sleeve to lower the operating temperature needed for stable combustion.

In a preferred arrangement, the gaseous fuel injection nozzle is aligned along the center of the combustion chamber recess. This centric arrangement results in a uniformly distributed injection of the gaseous fuel into the combustion chamber recess, and is conducive to a complete mixing with the air within the intake charge. Furthermore, the centric arrangement of the gaseous fuel injection nozzle makes it possible to design the cylinder head as a three-valve or four-valve cylinder head.

In a preferred method, an ignition quantity of fuel that represents 5% to 10% of the fuel quantity needed at full load is introduced into the combustion chamber in a first injection event. A second injection event is employed to inject a main quantity of fuel into the combustion chamber to supplement the ignition quantity of fuel to provide the amount of fuel required to satisfy the demanded engine load, as determined by the engine controller by referring to an engine map. This allows the timing for the first injection event to be governed by the desired ignition timing and the timing for the second injection event to be governed by timing that can result in improved combustion characteristics. For example, the two separate fuel injection events can be timed to provide more intensive and thus more stable ignition of the fuel-air mixture without an increase in the surface temperature of the igniter, a prerequisite for lower emissions of carbon monoxide and unburned fuel. In addition, because some of the fuel is introduced during the first injection event, this results in a smaller ignitable mixture volume at the time of the beginning of combustion, which leads to a lower heat release rate and thus less combustion noise.

For precise control the injection process and to ensure that the cylinders of the internal combustion engine follow the same combustion sequence, the engine can further comprise sensors and/or electronic controllers capable of detecting the time of injection. The preferred method can employ variable flow rates, achieved by controlling the stroke of the valve needle, independent of the operating point, by monitoring the movement of one or all of the valve needles.

On account of the high ignition reliability of the fuel-air mixture that is achievable with the disclosed ignition device, the engine's exhaust gas is particularly suitable for re-circulating a controlled amount back into the engine's air intake system, using what are known as techniques for exhaust gas recirculation ("EGR"). Accordingly, in a preferred embodiment the engine further comprises an EGR system for directing into an air intake system, a portion of the exhaust gas exhausted from the combustion chamber. The recirculated exhaust gas can be cooled or uncooled before being introduced into the air intake system, depending upon the engine's operating conditions. With the disclosed method, exhaust gas recirculation rates of up to 70% can be employed to reduce nitrogen oxide emissions.

BRIEF DESCRIPTION OF THE DRAWINGS

Further advantageous embodiments of the invention can be found in the description of the figures, which illustrates in more detail a preferred embodiment of the invention.

FIG. 5A is an enlarged view of a detail from the section view of FIG. 5, showing the physical relationship between the nozzle of the fuel injection valve and the ignition device;

DETAILED DESCRIPTION

Figures 1, 2:
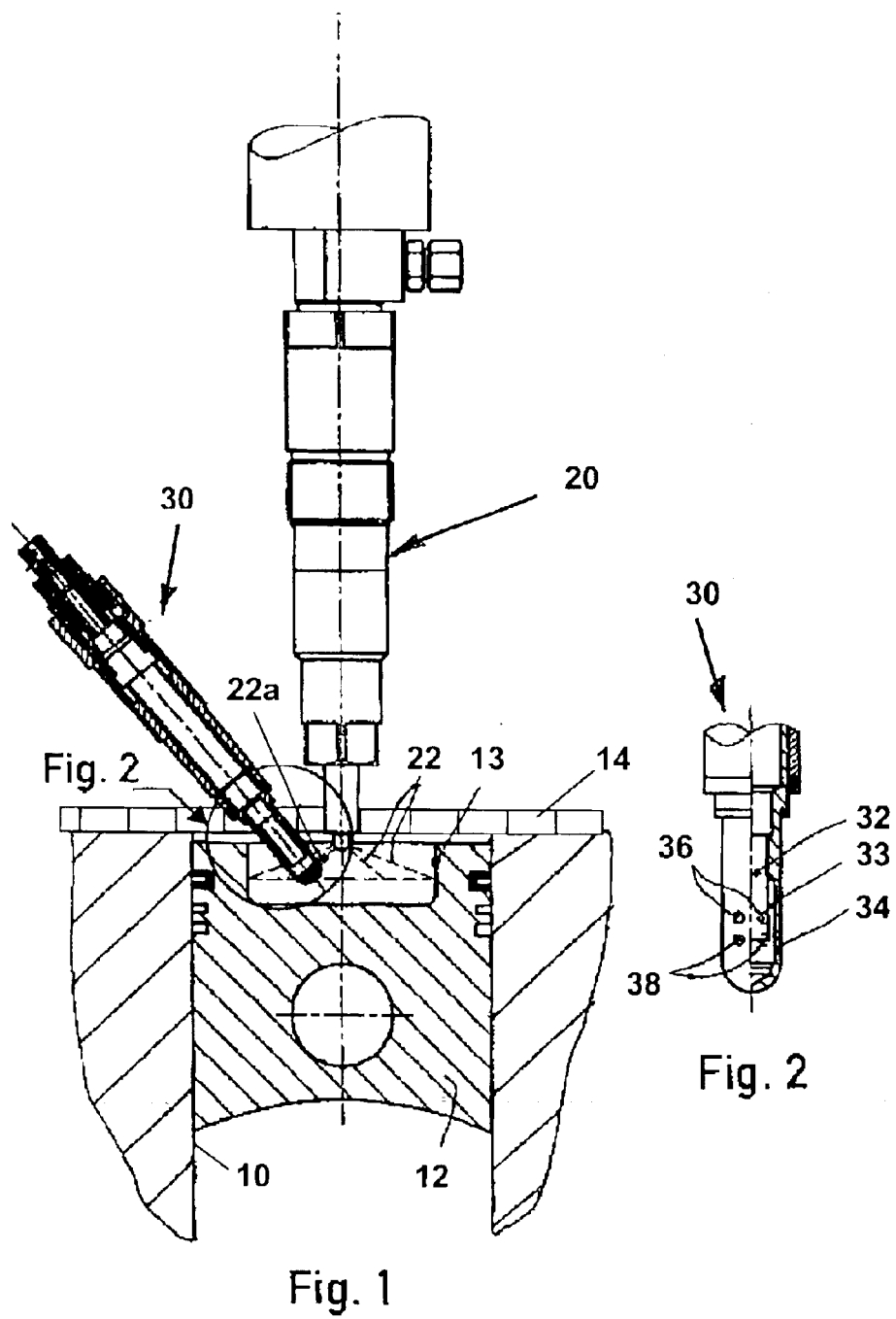
FIG. 1 shows a side view of the gaseous fuel injection nozzle and ignition device disposed within the combustion chamber.
FIG. 2 shows a detailed view of the ignition device of FIG. 1 with the lower portion of the housing or holder into which the igniter is mounted.

FIG. 1 is a partial cross-section of a gaseous-fueled internal combustion engine illustrating a preferred embodiment of a combustion chamber, which is defined by cylinder 10, piston 12, which is reciprocable within cylinder 10, and cylinder head 14, which covers the top end of cylinder 10. Fuel injection valve 20 and ignition device 30 are mounted in cylinder head 14 with respective tips that extend into the combustion chamber. This internal combustion engine can be of an inline- or V-design with various desired numbers of cylinders and displacement.

Piston 12 preferably is substantially the same as the piston employed in an equivalent diesel-fueled engine, and typically comprises chamber recess 13. A simple shape for chamber recess 13 is shown for illustrative purposes, but persons skilled in the technology will understand that other shapes can be employed. For example, smaller engines can use a re-entrant combustion chamber with a pip to promote turbulence for improved mixing. The rapid formation of a fuel-air mixture within the combustion chamber can also be supported by turbulence and swirl within the cylinder charge during a fuel injection event.

The tip of fuel injection valve 20 comprises a gaseous fuel injection nozzle with a plurality of fuel injection ports through which gaseous fuel is introduced directly into the combustion chamber. At least one of the fuel injection ports is aimed at an impingement point on ignition device 30. In the illustrated embodiment, fuel injection valve 20 is aligned with the centerline of combustion chamber recess 13 and preferably comprises between four and twelve fuel injection ports with fuel sprays 22 from such injection ports depicted in FIG. 1 by dashed lines. One of the fuel injection ports is aimed to direct fuel spray 22a at an impingement point on ignition device 30.

With reference to FIG. 2, ignition device 30 comprises igniter 32 and sleeve 34, which is disposed around igniter 32 to provide a shielded space between igniter 32 and the inner surface of sleeve 34. In the illustrated embodiment, the shielded space comprises an annular space between igniter 32 and the interior wall of sleeve 34 and the space between the free end of igniter 32 and the dome-shaped closed end of sleeve 34. A dome-shaped end is preferred compared to a square or flat end because a domed-shape provides better structural strength, while reducing the extent to which ignition device 30 protrudes into the combustion chamber.

Reference number 33 identifies the shielded space in FIG. 2. The impingement point is a point on the outer surface of sleeve 34 that is proximate to at least one intake opening 36 provided through sleeve 34. Intake opening 36 and discharge opening 38 allow fluid communication between shielded space 33 and the combustion chamber. In the embodiment illustrated in FIG. 2 there are two intake openings 36. The open area and the position of intake opening(s) 36 relative to the impingement point are designed to allow an amount of gaseous fuel to enter shielded space 33 that is sufficient to ignite and cause ignition of substantially all of the gaseous fuel in the combustion chamber. Experiments have shown that the illustrated arrangement with two intake openings 36, each with a diameter of between 0.8 and 1.2 millimeters, can be effective. Experiments using a hole diameter of 0.55 millimeter for each of two intake and two discharge openings was tried, and the engine was operable but the ignition device was less effective. It is expected that the effectiveness of the smaller holes can be improved by increasing the number openings. Computational fluid dynamic analysis can be used to further study intake opening size, position and number. It is presently understood that sizing intake opening 36 too small will not allow a sufficient quantity of fuel to enter shielded space 33, whereas sizing the intake opening too large can lead to excessive flow between shielded space 33 and the combustion chamber, which can cause excessive cooling of igniter 32 and reduce pressure build up within shielded space 33, causing slower or less extensive penetration of the burning fuel-air mixture that is propelled into the combustion chamber.

Figure 3:
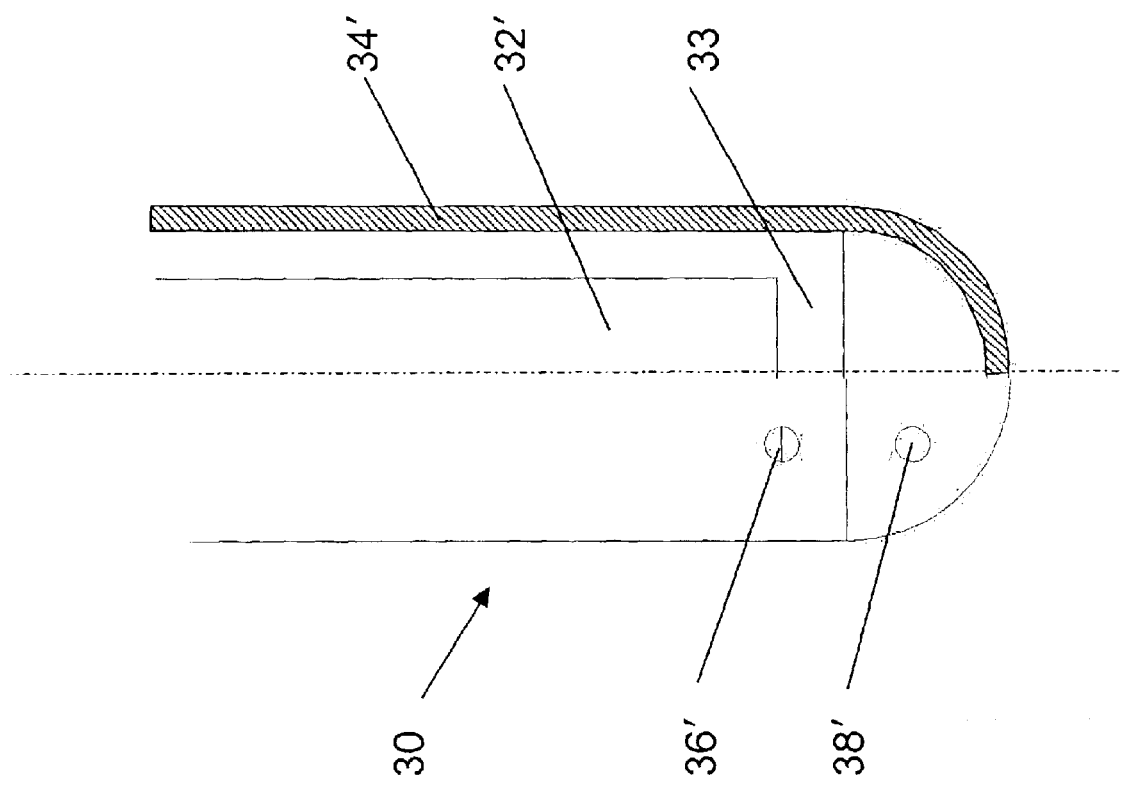
FIG. 3 shows a detailed view of another embodiment of the ignition device of FIG. 1, shown with half of the ignition device in a cut away view to show the position of the igniter within the sleeve.

FIG. 3 illustrates another preferred embodiment of ignition device 30 wherein discharge openings 38' are positioned in the dome-shaped end of sleeve 34'. An advantage of locating discharge openings 38' in the dome-shaped end is that the length of ignition device 30 can be shorter than if the discharge openings were located in the cylindrical side walls as they are in the embodiment of FIG. 2.

With some piston head designs, such as ones that employ a pip, depending upon how far ignition device 30 protrudes into the combustion chamber, a dimple can be formed in the piston head opposite ignition device 30 to prevent contact therebetween during engine operation.

FIG. 3 also illustrates a preferred position of igniter 32' within sleeve 34'. The end of igniter 32' is preferably within 3 millimeters of the centerline of intake opening 36', with more preferred embodiments locating the end of igniter 32' within 1 millimeter of the centerline of intake opening 36' or level with the centerline of intake opening 36', as shown in FIG. 3.

Figure 4:
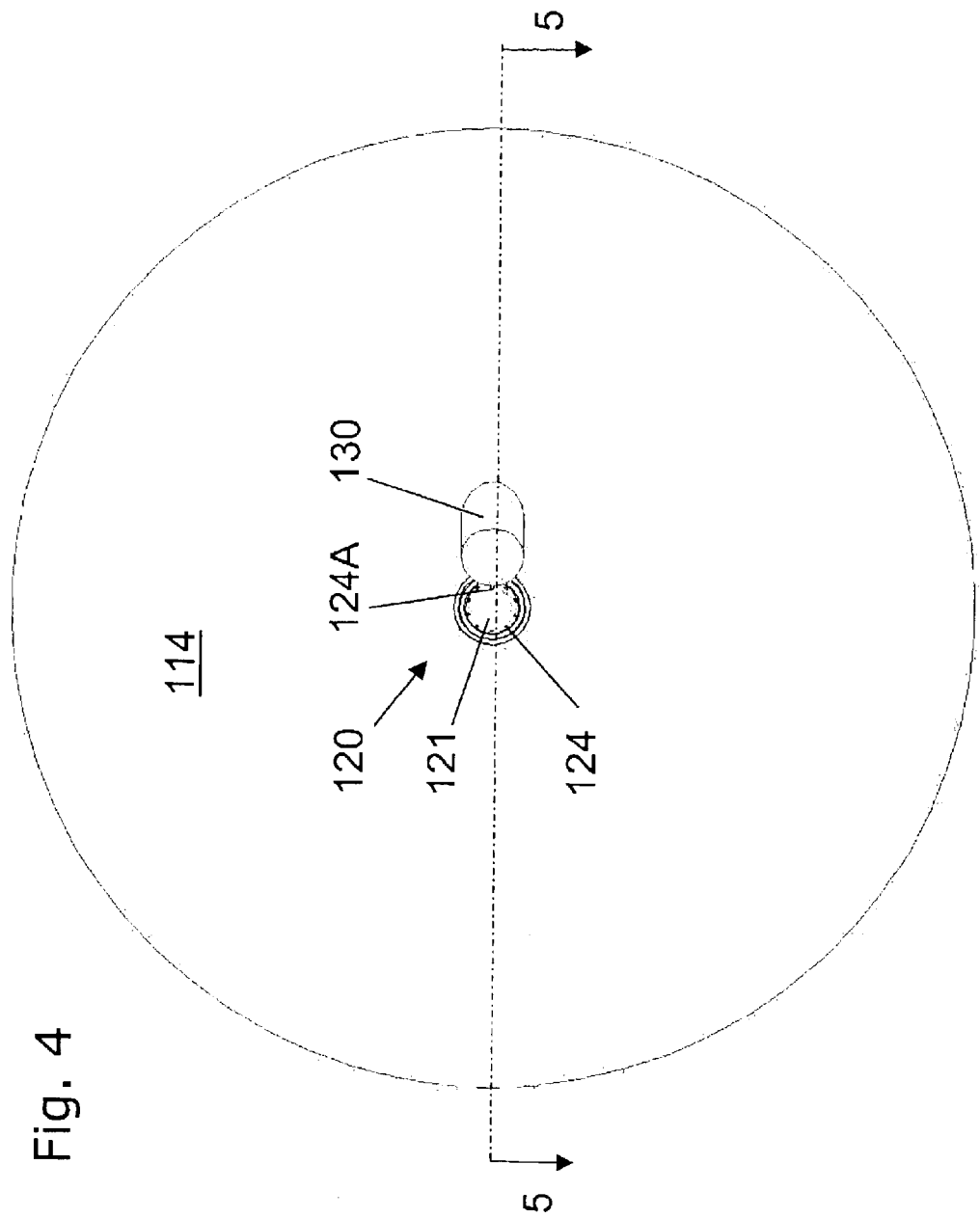
FIG. 4 shows a plan view of the cylinder head viewed from the bottom of the combustion chamber as if the piston were removed, showing the position of the fuel injection valve relative to the ignition device.

FIG. 4 is a plan view of a cylinder head viewed from within the combustion chamber as if the piston were removed. In this embodiment, elements that correspond to similar elements to those in FIGS. 1 through 3 are indicated by reference numbers increased by an increment of 100. For simplicity, the intake and exhaust valves are not shown, but with the positioning of injection valve 120 and ignition device 130 in the central region of the cylinder head area, two, three, and four valve designs can be accommodated.

Figure 5:
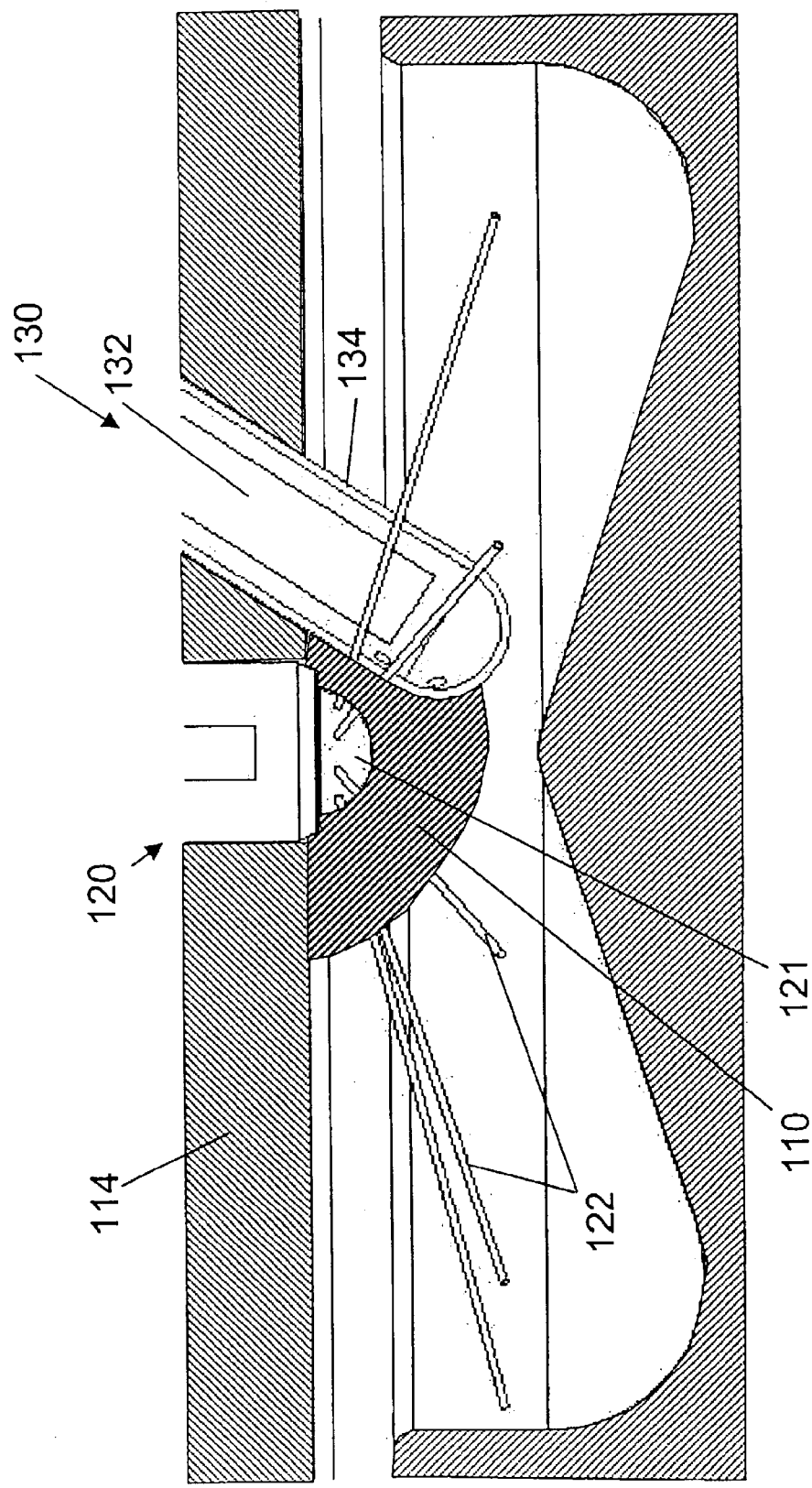
FIG. 5 is a partial section view indicated by a section line shown in FIG. 4. The partial section of FIG. 5 shows outlines of fuel sprays indicating preferred injection angles for directing an ignition fuel spray towards the ignition device and into the combustion chamber.

Fuel injection valve 120 comprises nozzle 121 with fuel injection ports 124. Fuel injection port 124A is oriented to direct an ignition fuel spray towards ignition device 130, which is inclined towards nozzle 121. The position of ignition device 130 in cylinder head 114 is chosen so that the fuel spray introduced through fuel injection port 124A possesses a free spray length of between 3 millimeters and 8 millimeters, or 5% to 10% of the diameter of the combustion chamber recess depending upon the size of the combustion chamber. The amount of fuel introduced into the engine depends upon operating conditions such as load, and whether the load is static or dynamic (i.e. changing). Experimental results have shown that, under expected conditions, the above-stated spacing between the fuel injection port and the impingement point results in a sufficient quantity of gaseous fuel entering shielded space 33 to form a combustible fuel-air mixture that comes into contact with the igniter. A "sufficient quantity of gaseous fuel" is defined herein as a quantity of fuel that results in the formation of a combustible mixture within the shielded space that is ignitable to produce a burning fuel-air mixture capable of exiting the shielded space and igniting a combustible fuel-air mixture within a region surrounding fuel injection valve nozzle 121. With reference to FIG. 5, hatched region 110 is the region that surrounds fuel injection valve nozzle 121 towards which the burning combustible fuel-air mixture is directed. That is, discharge openings 138' are oriented so that the burning combustible fuel-air mixture propelled from shielded space 33 ignites the fuel in region 110.

FIG. 5 is a partial section view of the section indicated by section line 5 in FIG. 4, and FIG. 5A is an enlarged view of the area near fuel injection valve nozzle 121 and ignition device 130. Fuel injection valve 120 and ignition device 130 are mounted in cylinder head 114 and protrude therefrom. Igniter 132 is shown disposed within sleeve 134 of ignition device 130.

Axes 122 illustrate the direction that fuel sprays are introduced into the combustion chamber through fuel injection ports 124, demonstrating by way of example, a preferred injection angle for the depicted combustion chamber geometry. As is well known to those skilled in the technology, gaseous fuel that is introduced into a combustion chamber in this manner disperses from axes 122 with more dispersion occurring as the fuel travels further from nozzle 121. Axes 122 are intended to show only the injection angle of the central axes of the fuel sprays. Fuel injection ports 124 are preferably oriented to provide an injection angle of between 10 and 25 degrees, which is selected to provide uniform distribution of the gaseous fuel within the combustion chamber, with the selected injection angle being dependent upon an engine's combustion chamber geometry. In preferred embodiments, the selected injection angle is chosen to optimize fuel spray length while aiming the fuel sprays at turbulent regions within the combustion chamber. For improved fuel distribution, longer fuel spray lengths are preferred.

In the illustrated embodiment, as shown in FIG. 5A, compared to the other fuel sprays, the injection angle of ignition fuel spray 122A, which is introduced through fuel injection port 124A, has a different injection angle, and fuel injection port 124A is positioned at a lower level on nozzle 121 compared to fuel injection ports 124. The injection-angle of ignition fuel spray 122A is determined by the angle required to orient the direction of ignition fuel spray 122A so that ignition fuel spray 122A is directed towards an impingement point on the surface of the sleeve so that a substantial portion of the ignition fuel spray flows in a spray direction that is less than or equal to 25 degrees from an axis perpendicular to the plane that is tangential to the sleeve at the impingement point.

In order to introduce the gaseous fuel directly into the combustion chamber near top dead center, the gaseous fuel is supplied to fuel injection valve 120 at high pressure. For example, gaseous fuel can be supplied with a pressure of between 200 and 300 bar, which results in the gaseous fuel being injected into the combustion chamber at high velocity. Ignition of the gaseous fuel is improved by reducing the velocity of the fuel that is brought into contact with the igniter. When the gaseous fuel is directed towards sleeve 134 so that the fuel is flowing in a direction that is perpendicular to the surface of sleeve 134 when it hits the surface, the change in momentum caused by the fuel striking the sleeve surface is maximized whereby the reduction in fuel velocity is also maximized. Accordingly, in the most preferred embodiment the ignition fuel spray is oriented so that a substantial portion of the fuel is flowing in a direction that is perpendicular to the plane that is tangential to the surface of the sleeve at the impingement point (as shown in FIG. 5A). However, in some cases, constraints imposed by an engine's combustion chamber geometry or cylinder head design can dictate a less preferred orientation for the ignition fuel spray, and experiments have shown that orientations where the ignition fuel spray direction is less than or equal to 25 degrees from a perpendicular alignment have also yielded working embodiments, though less preferred.

With reference to FIG. 5A, an enlarged side view is shown of the arrangement between nozzle 121 of fuel injection valve 120 and ignition device 130. It is believed that ignition fuel spray 122A entrains some air as it travels towards the impingement point, but that it also mixes with air that has flowed into shielded space 33 during the engine piston's intake and compression stroke. It is also believed that directing fuel spray 122A towards an impingement point, rather than being aimed directly at intake opening 136' results in improved mixing and reduced cooling effects.

When a combustible fuel-air mixture forms within shielded space 33, it contacts the hot surface of the igniter, and is ignited. The pressure within shielded space 33 increases rapidly as a result of combustion and the restricted flow between the shielded space 33 and the combustion chamber. This elevated pressure propels a burning fuel-air mixture into the combustion chamber through at least one discharge opening 138'. In the illustrated embodiments, there are two discharge openings 38, 38' and 138', in FIGS. 2, 3 and 5A respectively, with only one half of the sleeve being shown in FIG. 5A.

The discharge openings are spaced apart from the intake openings so that the discharge openings can be oriented to aim the burning fuel-air mixture to region 110 of the combustion chamber for efficient burning of the combustible fuel-air mixture that forms as a result of an injection event. The discharge openings are spaced further from the impingement point than the intake openings. Under preferred operating conditions, an injection event continues while the burning fuel-air mixture emerges from shielded space 33, and it is believed that the spacing of the discharge openings from the impingement point reduces interference between the burning fuel-air mixture that emerges from ignition device 30 and the ignition fuel spray that is directed towards the impingement point on ignition device 30. Reducing such interference can help to produce a very short ignition lag, which has a positive effect on the operating characteristics of the internal combustion engine. Compared to liquid fuels, a fuel injection event with a longer duration can be required to inject a gaseous fuel. Accordingly, the arrangement of the intake and discharge openings in relation to the impingement point is important because fuel injection valve 20 can continue to inject gaseous fuel into the combustion chamber after combustion is initiated because the ignition fuel spray does not interfere significantly with the spread of the burning fuel-air mixture propelled through the discharge openings. A longer duration for a fuel injection event can be advantageous in some preferred embodiments, because then the burning fuel-air mixture can be aimed at region 110 that surrounds fuel injection valve nozzle 121 where the fuel sprays that are being simultaneously injected into the combustion chamber. In such embodiments, when a single fuel injection event is employed in an engine cycle, the ignition lag can be shorter than the time duration of the corresponding injection event.

Another reason for spacing the discharge opening further from the impingement point is that this arrangement ensures that most of the fuel enters into shielded space 33 through the intake openings, allowing some air from within shielded space 33 to be displaced back into the combustion chamber through the discharge openings, thereby facilitating the entry of gaseous fuel into shielded space 33 through the intake openings at the beginning of the injection event. Accordingly, there are a number of advantages associated with the disclosed arrangement with at least one intake opening and at least one discharge opening, with the function of these openings determined by their respective spacing from the impingement point. As shown in the illustrated embodiments, the discharge openings are positioned below the intake openings. In the illustrated embodiments, the impingement point is preferably equidistant from the intake openings and could be the mid-point between them or another location along the center axis of ignition device 30 that is closer to the intake openings than to the discharge openings.

The gaseous fuel injection valve can be a hydraulically actuated valve, with the hydraulic pressure being controlled by an electromagnetic hydraulic valve. To implement pre-injection and division of the main injection into several injection steps or "pulses", it is possible to use a hydraulically switched valve driven by a piezoelectric actuator, since such a valve possesses a sufficiently high switching frequency. Tests have shown that a hydraulically activated valve driven by a piezoelectric actuator in combination with the hydraulic operation of the gaseous fuel valve meets the requirements for switching frequency and accuracy for controlling the beginning and duration of injection.

In another embodiment, a gaseous fuel injection valve that employs a needle that is directly actuated by an electromagnetic actuator can be employed. An example of such an injection valve is disclosed in U.S. Pat. No. 6,298,829. In such a fuel injection valve, hydraulic actuation fluid is not needed and the movement of the armature of the electromagnetic actuator causes a corresponding movement of the needle to open and close the fuel injection valve. A fuel injection valve with such an electromagnetic actuator can provide the necessary speed for allowing injection events with short pulse widths and more than one injection event in a single engine cycle.

In still other preferred embodiments, the fuel injection valve can be "directly" actuated by a piezoelectric or magnetostrictive actuator that provides the motive force for displacing a valve member to open and close the fuel injection valve. Such actuators can be operated with even shorter fuel injection pulse widths and can be suitable for engines that are designed to operate at can be employed with higher crankshaft speeds. A further advantage of using a directly actuated injection valve is that in addition to providing the requisite speed for multiple injection pulses during a single engine cycle, piezoelectric and magnetostrictive actuators can also be controlled to enable "rate shaping" which means that the degree of displacement caused by the actuator during an injection pulse can be controlled to adjust flow rate through the fuel injection valve during a fuel injection pulse.

Figure 6:
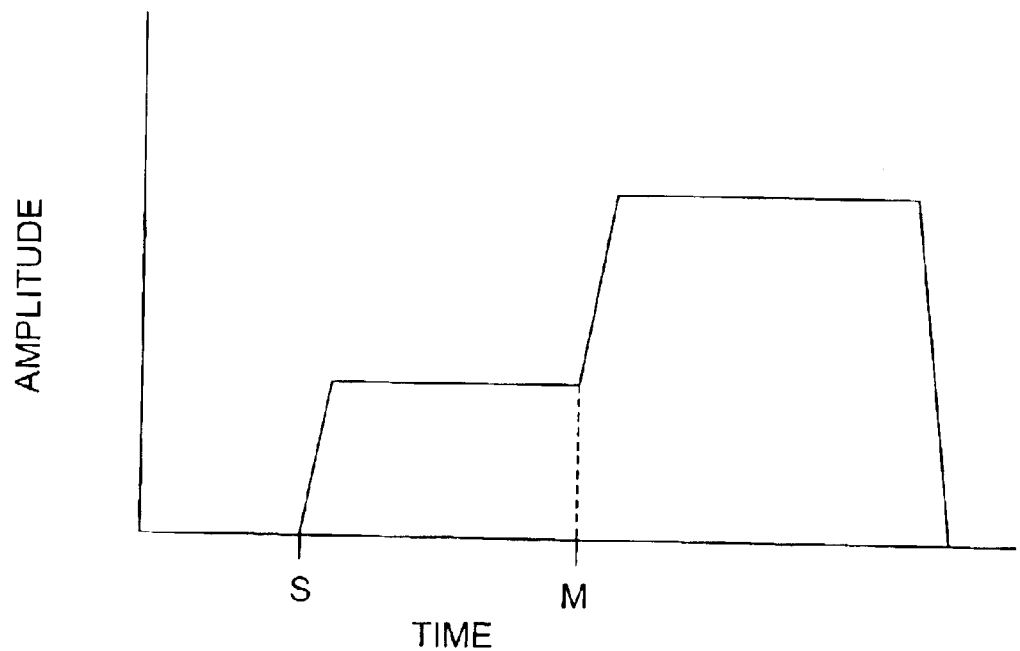
FIG. 6 is a drawing that represents a preferred command pulse for controlling the actuation of a fuel injection valve to control the mass flow rate for introduction of the gaseous fuel into the combustion chamber in a single injection event.
Figure 7:
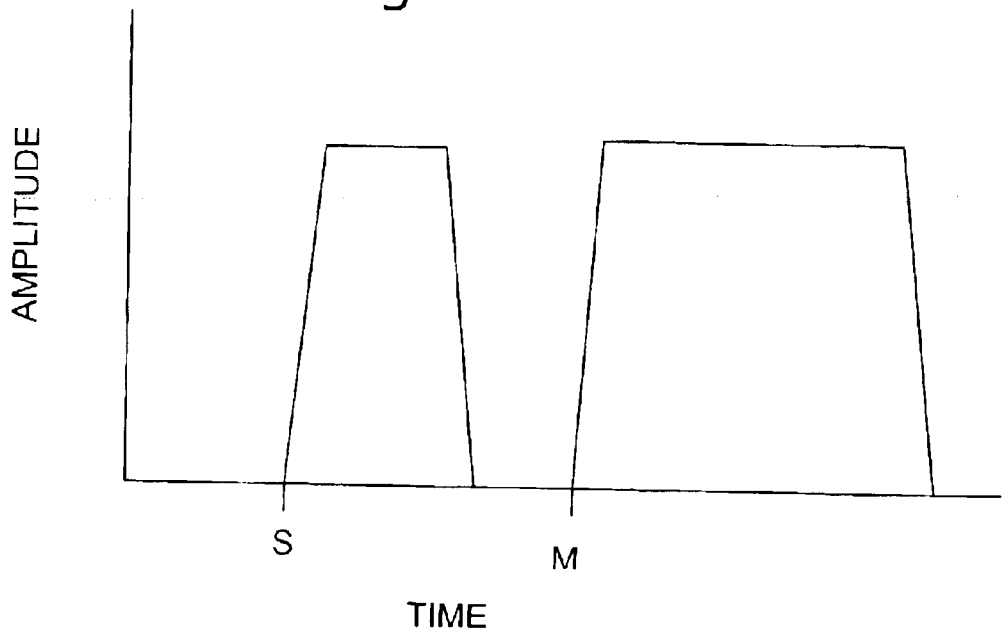
FIG. 7 is a drawing that represents another preferred command pulse for controlling the actuation of a fuel injection valve to control the mass flow rate for introduction of the gaseous fuel into the combustion chamber, in a two separate injection events.

The graphs of FIGS. 6 and 7 plot the amplitude of a command pulse for controlling a directly actuated fuel injection valve to introduce fuel into a combustion chamber for one combustion cycle, with a separate command pulse for each combustion cycle.

The amplitude that marks the vertical axis of these graphs represents different units for different types of actuators. For example, for a magnetostrictive actuator, amplitude represents electrical current directed to a coil to produce a magnetic field. In another example, for a piezoelectric actuator, amplitude represents the voltage applied to the piezoelectric elements. Movement of the valve needle correlates generally to the amplitude of the command pulses, with more fuel being introduced when a larger amplitude is commanded.

With respect to FIG. 6, in a preferred method the time between S and M is about 2 ms. The purpose of introducing a smaller quantity of fuel at the beginning of the injection event is to introduce only the amount of fuel that is needed to initiate combustion so that a sufficient amount of fuel is ignited by the ignition device to produce a burning combustible mixture that is directed back into the combustion chamber to ignite a combustible fuel mixture within region 110, which surrounds fuel injection valve nozzle 121. Because gaseous fuels can have a longer ignition delay than conventional auto-igniting liquid fuels, shaping the mass flow rate for introducing gaseous fuel into a combustion chamber is more important than it is for liquid fuels. Because of the ignition delay the ignition fuel spray is introduced into the combustion chamber much earlier than one would want to inject a main fuel pulse. Accordingly, a smaller amplitude is employed between the start of the injection event at time S and the start of the main fuel pulse at time M to avoid premature introduction of an excessive amount of fuel into the combustion chamber. The timing for time M is typically between 5 to 34 degrees before top dead center, and the duration of the fuel injection event can continue well after top dead center, depending upon the desired heat release.

In the method illustrated by FIG. 7, a first injection event begins at time S followed by a second injection event beginning at time M. In this embodiment, an injection duration for the first injection event of between about 0.2 and about 0.5 milliseconds has been successful with the time between time S and time M being between 0.25 and 1 milliseconds. Again, time M can occur between 5 and 34 crank angle degrees before top dead center and time S can be between 6 and 13 crank angle degrees before time M.

Ignition device 30 can employ an igniter with a ceramic surface, because ceramic materials can be fabricated with the durability needed for the harsh conditions under which the ignition device operates. To further improve the stability of ignition device 30, the shielding sleeve 34 can also be a ceramic material. A catalytic coating can also be provided on sleeve 34, comprising platinum and/or palladium to accelerate the ignition process for improved combustion stability. The use of such a catalytic coating is especially advantageous for smaller engines, because the size of the combustion chamber normally dictates a shielded space with a smaller volume, leading to a smaller fuel volume being ignited at the hot surface; in such an engine, an ignition device without a catalytic coating could result in slower combustion and correspondingly higher hydrocarbon and carbon monoxide emissions.

Figure 8:
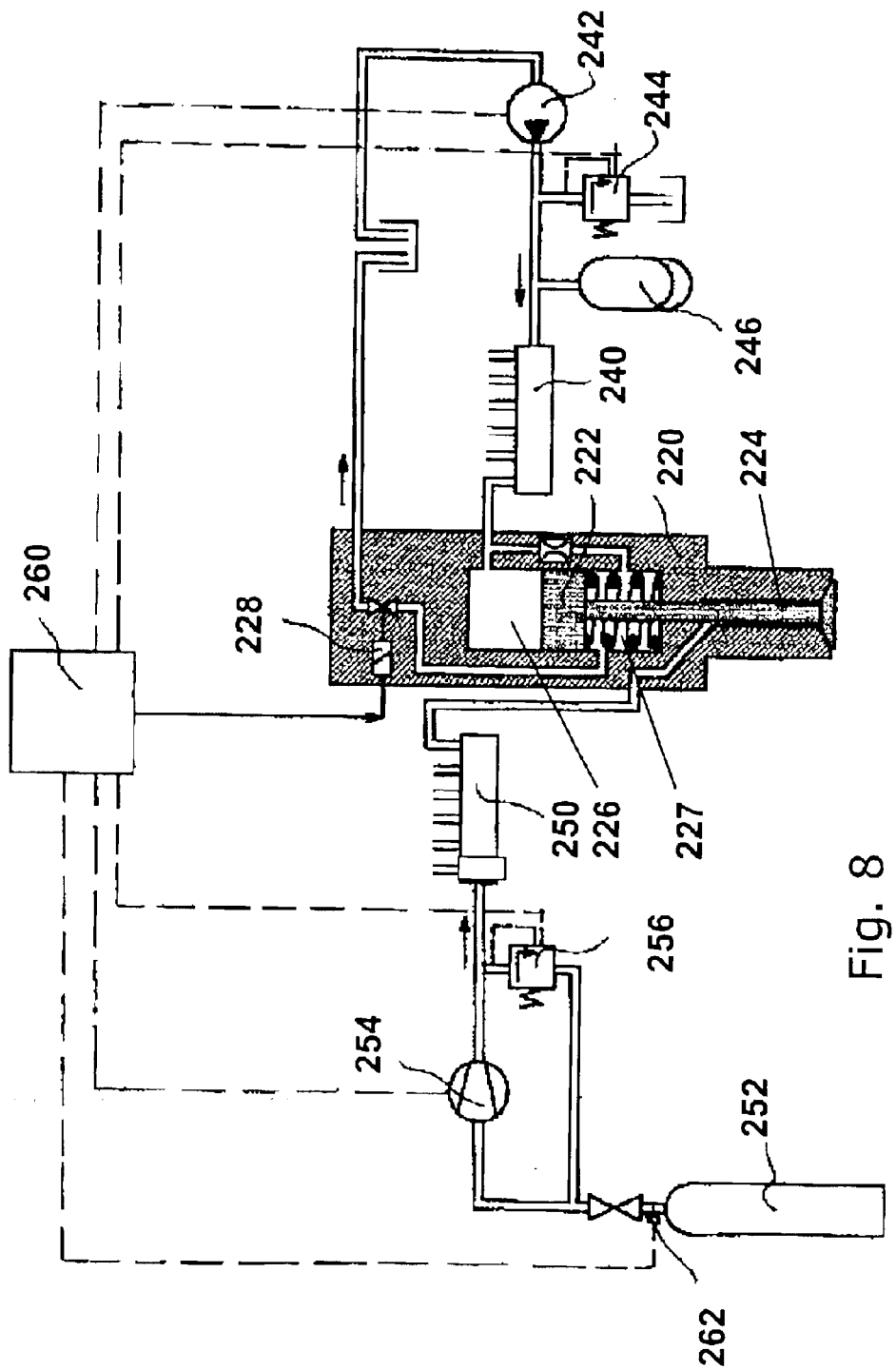
FIG. 8 shows an overall schematic diagram of the fuel and hydraulic systems associated with the gaseous fuel injection valve, and the controller for these systems.

The method of operating an internal combustion engine with gaseous fuel being directly injected into the combustion chamber requires a constant high fuel pressure upstream of gaseous fuel injection valve 20. If the engine is to be used in a vehicle, it is necessary to provide an on-board high-pressure fuel supply system. FIG. 8 shows one embodiment of such a fuel system with devices for supplying a gaseous fuel and for providing hydraulic fluid for operating gaseous fuel injection valve 220. Gaseous fuel injection valve 220 is operable by hydraulic fluid pressure, which acts upon piston 222. Piston 222 is associated with valve needle 224 whereby movement of piston 222 causes a corresponding movement of valve needle 224.

In a multi-cylinder internal combustion engine, a gaseous fuel injection valve is provided for each combustion chamber and common hydraulic fluid supply line 240 supplies hydraulic fluid to each one of the fuel injection valves. Hydraulic pump 242 preferably generates a pressure of 250 to 300 bar. The pressure within hydraulic fluid supply line 240 is controlled by pressure control valve 244, and pressure accumulator 246 is filled to maintain hydraulic pressure, even after the engine has been turned off.

On the fuel side, and continuing with the example of a multi-cylinder engine as suggested in FIG. 8, gaseous fuel injection valve 220 is supplied with a gaseous fuel pressure of between 200 and 300 bar through a common fuel supply line 250 that supplies fuel to each one of the gaseous fuel injection valves. The gaseous fuel is stored in fuel storage tank 252 and supplied to the fuel supply system at a pressure corresponding to the amount of gaseous fuel remaining therein. When fuel storage tank 252 is filled to maximum capacity, the pressure of the fuel delivered to the fuel supply system will be high, and as the tank is emptied, pressure within fuel storage tank 252 decreases. If gaseous fuel storage tank 252 is fully charged, for example, with a pressure of between 200 and 300 bar, then controller 260 determines this from pressure transducer 262 and controller 260 considers engine operating conditions when controlling compressor 254 and pressure control device 256 to supply the needed amount of gaseous fuel to the injection valves at the desired pressure. As more gaseous fuel is removed, and the pressure is correspondingly lower, as detected by pressure transducer 262, and controller 260 takes this into account when controlling compressor 254 and pressure control device 256.

Controller 260 can also be programmed and wired to control the hydraulic fluid pressure in the hydraulic system by controlling hydraulic pump 242 and pressure control valve 244, and the actuation of fuel injection valve 220 and the other fuel injection valves in a multi-cylinder engine. In the illustrated embodiment, controller 260 is wired to control solenoid valve 228 by opening or closing the hydraulic fluid drain line. When controller 260 opens control solenoid valve 228 hydraulic fluid is drained from spring chamber 227 within injection valve 220, and the pressure of the hydraulic fluid in control chamber 226 (above spring chamber 227) acts to push piston 222 downwards, whereby valve needle 224 also moves downwards to open fuel injection valve 220 and inject fuel into the combustion chamber. The illustrated fuel injection valve has an outward opening needle, and those skilled in the technology will understand that an inward opening needle is also suitable, and in either case, the nozzle of the fuel injection valve is preferably provided with features for directing fuel sprays into the combustion chamber and aiming one of the fuel sprays towards an impingement point on the ignition device.

The fuel system of FIG. 8 can also be employed with a directly actuated fuel injection valve, except that instead of a hydraulic fluid system, controller 260 would send control signals directly to the fuel injection valve to cause actuation by controlling the electrical current or voltage that is directed to the actuator. While particular elements and embodiments of the present invention have been shown and described, it will be understood, of course, that the invention is not limited thereto since modifications may be made by those skilled in the art without departing from the scope of the present disclosure, particularly in light of the foregoing teachings. By way of example, a liquefied gaseous fuel supply system comprising a cryogenic storage tank, a fuel pump, a vaporizer, and associated pressure control devices could be substituted for the compressed gaseous fuel supply system shown in FIG. 8.

What is claimed is:

1. An internal combustion engine fueled with a combustible gaseous fuel, said engine comprising:
    at least one combustion chamber defined by a cylinder, a piston reciprocable within said cylinder, and a cylinder head that covers an end of said cylinder;
    an ignition device with an end disposed within said combustion chamber, said ignition device comprising an igniter that is heatable to provide a hot surface and a sleeve surrounding said igniter, said sleeve defining a shielded space between said igniter and said sleeve;
    a fuel injection valve disposed within said combustion chamber, said fuel injection valve being operable to introduce said combustible gaseous fuel into said combustion chamber with a plurality of fuel sprays each released from one of a plurality of fuel injection ports, wherein one of said plurality of fuel injection ports is oriented to direct a fuel spray, referred to as an ignition fuel spray, towards an impingement point on a surface of said sleeve so that when said ignition fuel spray exits its respective fuel injection port a substantial portion of said ignition fuel spray is flowing in a spray direction that is oriented less than or equal to 25 degrees from an axis perpendicular to a plane that is tangential to said sleeve at said impingement point;
    an intake opening provided through said sleeve near said impingement point connecting said shielded space to said combustion chamber whereby, when said ignition fuel spray impacts said impingement point, a portion of said combustible gaseous fuel contained within said ignition fuel spray passes through said intake opening and into said shielded space;
    a discharge opening provided through said sleeve, wherein said discharge opening is oriented to direct a burning fuel-air mixture from said shielded space and towards said plurality of fuel sprays near said fuel injection valve; and
wherein said sleeve restricts flow between said shielded space and said combustion chamber so that combustion of said combustible gaseous fuel within said shielded space produces a pressure therein that is higher than the pressure within the combustion chamber and said pressure is high enough to propel said burning fuel-air mixture into said combustion chamber and into contact with said plurality of the fuel sprays.

2. The internal combustion engine of claim 1 wherein said hot surface of said igniter is provided by a member that extends into said shielded space from a holder mounted in said cylinder head.

3. The internal combustion engine of claim 2 wherein said member has a tip located within 3 millimeters of the centerline of said intake opening.

4. The internal combustion engine of claim 2 wherein said member has a tip located within 1 millimeter of the centerline of said intake opening.

5. The internal combustion engine of claim 2 wherein said member has a tip located where it is level with the centerline of said intake opening.

6. The internal combustion engine of claim 1 wherein said spray direction of said substantial portion of said ignition fuel spray is substantially perpendicular to said plane that is tangential to said sleeve at said impingement point.

7. The internal combustion engine of claim 1 wherein said ignition fuel spray has a central axis that is substantially perpendicular to said plane that is tangential to said sleeve at said impingement point.

8. The internal combustion engine of claim 1 wherein said fuel injection valve has a longitudinal axis that is parallel to a longitudinal axis of said cylinder, and said end of said ignition device disposed within said combustion chamber is angled towards said fuel injection valve whereby said ignition device has a longitudinal axis that is at an acute angle to said longitudinal axis of said fuel injection valve.

9. The internal combustion engine of claim 1 wherein each one of said plurality of fuel injection ports is oriented to direct said plurality of fuel sprays into said combustion chamber at a first injection angle measured from said cylinder head, except for the fuel injection port that is associated with said ignition fuel spray, which is oriented to direct said ignition fuel spray into said combustion chamber at a second injection angle, different from said first injection angle, wherein said second injection angle is predetermined by the alignment of said plane that is tangential to said sleeve at said impingement point relative to said fuel injection port, and said first injection angle is predetermined by the desired distribution pattern for introducing said gaseous fuel into said combustion chamber.

10. The internal combustion engine of claim 1 wherein at least one of said plurality of fuel sprays is introduced into said combustion chamber through one of said plurality of fuel injection ports that is oriented to direct said at least one fuel spray at an injection angle measured from said cylinder head that is different from that of said ignition fuel spray.

11. The internal combustion engine of claim 10 wherein said plurality of fuel sprays each have an injection angle that is between 10 and 25 degrees measured from said cylinder head.

12. The internal combustion engine of claim 10 wherein said at least one of said plurality of fuel sprays has an injection angle that is smaller than that of said ignition fuel spray.

13. The internal combustion engine of claim 1 wherein said engine is operable with a compression ratio up to 25:1.

14. The internal combustion engine of claim 1 wherein said engine is operable with a compression ratio between 13:1 and 25:1.

15. The internal combustion engine of claim 1 wherein said engine is operable with a variable compression ratio.

16. The internal combustion engine of claim 15 wherein said engine is operable with a compression ratio between 13:1 and 25:1.

17. The internal combustion engine of claim 1 wherein said intake opening is provided through a lateral surface of said sleeve and said discharge opening is provided through a dome-shaped end surface of said sleeve.

18. The internal combustion engine of claim 1 wherein said sleeve has a closed end with said intake opening and said discharge opening being the only means for fluid communications between said combustion chamber and said shielded space.

19. The internal combustion engine of claim 1 wherein said intake opening is one of a plurality of intake openings provided through said sleeve and each intake opening is located near said impingement point so that a portion of said combustible gaseous fuel contained within said ignition fuel spray enters said shielded space through said plurality of intake openings.

20. The internal combustion engine of claim 19 wherein there are two intake openings.

21. The internal combustion engine of claim 20 wherein said impingement point is equidistant from the center of each of said two intake openings.

22. The internal combustion engine of claim 20 wherein the centers of said two intake openings are spaced apart from each other by a distance of about 3 millimeters.

23. The internal combustion engine of claim 20 wherein said impingement point is the midpoint of a straight line drawn between the centers of each of said two intake openings.

24. The internal combustion engine of claim 23 wherein said discharge opening is one of two discharge openings provided through said sleeve.

25. The internal combustion engine of claim 24 wherein each one of said intake openings and said discharge openings is round and has a diameter no less than 0.5 millimeter and no more than 1.2 millimeters.

26. The internal combustion engine of claim 20 wherein said two intake openings are the same distance from said end of said ignition device.

27. The internal combustion engine of claim 1 wherein said discharge opening is one of a plurality of discharge openings provided through said sleeve.

28. The internal combustion engine of claim 27 wherein the size of each one of said plurality of discharge openings is determined by the combined open area required to allow a desired flow through said plurality of discharge openings during full load operating conditions.

29. The internal combustion engine of claim 28 wherein the combined open area of said intake and discharge openings is between about 0.75 and 5.0 square millimeters.

30. The internal combustion engine of claim 1 wherein said igniter is electrically heated.

31. The internal combustion engine of claim 30 wherein said igniter is a glow plug.

32. The internal combustion engine of claim 30 wherein said igniter has a ceramic surface.

33. The internal combustion engine of claim 30 wherein said igniter is catalytically coated.

34. The internal combustion engine of claim 1 wherein said sleeve is made from a ceramic material.

35. The internal combustion engine of claim 1 wherein said sleeve is coated with a catalytic coating for promoting reactions involving said combustible gaseous fuel and air to introduce reaction products into said shielded space that promote ignition at a lower surface temperature.

36. The internal combustion engine of claim 1 wherein said piston further comprises a recess that further defines the geometry of said combustion chamber.

37. The internal combustion engine of claim 36 wherein said fuel injection valve is mounted in said cylinder head and aligned with the center of said recess.

38. The internal combustion engine of claim 37 wherein the distance between said impingement point and said fuel injection port associated with said ignition fuel spray is between 5% and 10% of the diameter of said recess.

39. The internal combustion engine of claim 1 wherein said fuel injection valve and said ignition device are each mounted in said cylinder head.

40. The internal combustion engine of claim 39 wherein the distance between said impingement point and said fuel injection port associated with said ignition fuel spray is between 3 millimeters and 8 millimeters.

41. The internal combustion engine of claim 1 wherein said fuel injection valve is operable to provide a plurality of individual injection events during a single combustion cycle.

42. The internal combustion engine of claim 1 wherein the size of said discharge opening is determined by the open area required to allow a desired flow through said discharge opening during full load operating conditions.

43. The internal combustion engine of claim 1 wherein said fuel injection valve is operable to modulate flow rate between zero and a maximum flow rate during an injection event.

44. The internal combustion engine of claim 43 wherein flow rate through said fuel injection valve is controllable by controlling the movement of a needle within said fuel injection valve.

45. The internal combustion engine of claim 1 further comprising an exhaust gas recirculation system for directing into an air intake system, a portion of the exhaust gas exhausted from said combustion chamber.

46. The internal combustion engine of claim 45 wherein said portion of the exhaust is cooled prior to being directed into said air intake system, depending upon measured engine operating conditions.

47. The internal combustion engine of claim 1 wherein said fuel injection valve comprises between four and twelve fuel injection ports.

48. The internal combustion engine of claim 1 wherein said fuel injection valve is switched electromagnetically and hydraulically driven.

49. The internal combustion engine of claim 1 wherein said fuel injection valve is hydraulically driven using a hydraulic valve with a piezoelectric actuator.

50. The internal combustion engine of claim 1 wherein said fuel injection valve is electronically controlled and directly driven by an electromagnetic actuator.

51. The internal combustion engine of claim 1 wherein said fuel injection valve is electronically controlled and driven by a piezoelectric or magnetostrictive actuator.

52. A method of operating a gaseous-fueled internal combustion engine comprising at least one combustion chamber defined by a cylinder, a piston reciprocable within said cylinder, and a cylinder head that covers an end of said cylinder, said method comprising:
  introducing a gaseous fuel into said combustion chamber by means of a plurality of fuel sprays released into said combustion chamber from a fuel injection valve disposed within said combustion chamber;
  directing one of said fuel sprays, referred to as an ignition fuel spray to an impingement point on a surface of a sleeve that surrounds an igniter so that when said ignition spray exits its respective fuel injection port a substantial portion of said gaseous fuel flows towards said impingement point in a spray direction that is oriented between less than or equal to 25 degrees from an axis perpendicular to a plane that is tangential to said sleeve at said impingement point, whereby some of said gaseous fuel from said ignition fuel spray flows through an intake opening provided in said sleeve and mixes with air in a shielded space provided between said igniter and said sleeve to form a combustible fuel-air mixture next to said igniter;
  igniting said combustible fuel-air mixture by heating a surface of said igniter to a temperature that causes ignition of said combustible fuel-air mixture; and
  restricting fluid flow between said combustion chamber and said shielded space and retaining a substantial portion of said combustible fuel-air mixture within said shielded space until combustion of same increases pressure within said shielded space to a magnitude that propels a burning fuel-air mixture therefrom through at least one discharge opening and into contact with said plurality of fuel sprays in said combustion chamber in a region surrounding said fuel injection valve.

53. The method of claim 52 wherein said spray direction is substantially perpendicular to said plane that is tangential to said surface of said sleeve at said impingement point.

54. The method of claim 52 further comprising spacing said discharge opening a distance from said impingement point that is greater than the distance between said intake opening and said impingement point.

55. The method of claim 54 wherein said distance between said discharge opening and said impingement point provides spacing so that interference from said fuel spray that is directed at said impingement point does not prevent said burning combustible fuel-air mixture from being propelled into contact with said plurality of fuel sprays in said region surrounding said fuel injection valve.

56. The method of claim 52 further comprising injecting said gaseous fuel into said combustion chamber at a first flow rate when said engine is operating at low load or idle, and injecting said gaseous fuel into said combustion chamber at a second flow rate when said engine is operating at high load, wherein said second flow rate is higher than said first flow rate.

57. The method of claim 52 further comprising controlling the flow rate for injecting a desired quantity of said gaseous fuel into said combustion chamber so that the duration of an injection event is longer than an ignition delay associated with the ignition of said gaseous fuel that was directed towards said ignition device at the beginning of said injection event.

58. The method of claim 52 further comprising controlling injection timing and injection event duration as a function of measured engine operating conditions and by referring to an electronic engine map.

59. The method of claim 58 further comprising controlling said fuel injection valve to control the mass flow rate of said gaseous fuel that is introduced during an injection event, said method comprising:
referring to said electronic engine map and determining a total amount of said gaseous fuel that will be introduced during an injection event for a detected engine load;
during a first stage of said injection event, selecting a first mass flow rate that will cause said combustible mixture to form within said shielded space; and
during a second stage of said injection event, selecting a second mass flow rate that will augment the gaseous fuel introduced during said first stage to provide said total amount of gaseous fuel during said injection event.

60. The method of claim 59 wherein the duration of said first stage begins at least 2 milliseconds before said second stage.

61. The method of claim 59 wherein said second stage begins at between about 34 and 5 crank angle degrees before top dead center during a compression stroke.

62. The method of claim 59 wherein said gaseous fuel that is introduced during said second stage is ignited during said second stage.

63. The method of claim 52 further comprising introducing said gaseous fuel into said combustion chamber in a plurality of injection events during a single engine cycle.

64. The method of claim 63 wherein a first injection event is employed to introduce a first quantity of said gaseous fuel into said combustion chamber to be ignited by said ignition device, followed by at least one other injection event to introduce a second quantity of said gaseous fuel, wherein said first and second quantities of fuel together provide a total quantity of fuel that is equal to an amount determined by an engine controller, with reference to an engine map, and said first quantity of fuel is determined by said engine controller to be a quantity that is sufficient to ensure that said second quantity of fuel is ignited.

65. The method of claim 64 wherein said first quantity of said gaseous fuel is no more than 10% by mass of said total quantity of fuel when said engine is operated at full load.

66. The method of claim 64 wherein said first quantity of said gaseous fuel is between 5% and 10% by mass of said total quantity of fuel when said engine is operated at full load.

67. The method of claim 64 wherein said second injection event begins at between about 34 and 5 degrees before top dead center during a compression stroke.

68. The method of claim 64 wherein said first injection event has a duration of at least 0.2 milliseconds.

69. The method of claim 68 wherein said first injection event has a duration less than or equal to 0.5 milliseconds.

70. The method of claim 64 wherein said second injection event starts less than or equal to 1 millisecond after the end of said first injection event.

71. The method of claim 70 wherein said second injection event starts more than 0.2 millisecond after the end of said first injection event.

72. The method of claim 64 wherein said second quantity of said gaseous fuel is divided between a plurality of fuel injection events.

73. The method of claim 52 further comprising electrically heating said igniter to have a surface temperature that is hot enough to ignite said combustible fuel-air mixture.

74. The method of claim 73 further comprising controlling the temperature of said igniter as a function of a measured operating parameter of said engine.

75. The method of claim 52 further comprising catalytically coating said igniter.

76. The method of claim 52 further comprising catalytically coating said sleeve.

77. The method of claim 52 wherein said intake opening is one of a plurality of intake openings.

78. The method of claim 77 wherein each one of said plurality of intake openings is equidistant from said impingement point.

79. The method of claim 52 wherein said, discharge opening is one of a plurality of discharge openings.

80. The method of claim 79 wherein the size of said discharge openings is determined by the size needed to accommodate the desired flow through said discharge openings when said engine is operating at full load.

81. The method of claim 52 wherein said igniter comprises a ceramic surface.

82. The method of claim 52 further comprising aligning said fuel injection valve with the central axis of said combustion chamber.

83. The method of claim 52 further directing a portion of the exhaust gas exhausted from said engine into an air intake system.

84. The method of claim 83 further comprising controlling the amount of said portion of the exhaust gas that is directed into said air intake system depending upon measured operating conditions.

85. The method of claim 84 further comprising cooling said portion of the exhaust gas that is directed into said air intake system depending upon measured operating conditions.

86. The method of claim 85 further comprising controlling the amount of said portion of the exhaust gas depending upon measured operating conditions.

87. The method of claim 52 wherein said fuel spray that is directed towards said impingement point travels a distance of between 3 millimeters and 8 millimeters from said fuel injection valve to said impingement point.

88. The method of claim 52 further comprising operating said engine without throttling the intake air and with a lambda between 1.4 and 6.

* * * * *